United States Patent
Im et al.

(10) Patent No.: US 8,361,656 B2
(45) Date of Patent: Jan. 29, 2013

(54) COMPOSITE ANODE ACTIVE MATERIAL, METHOD OF PREPARING THE SAME, ANODE CONTAINING THE COMPOSITE ANODE ACTIVE MATERIAL, AND LITHIUM BATTERY CONTAINING THE COMPOSITE ANODE ACTIVE MATERIAL

(75) Inventors: Dong-min Im, Seoul (KR); Seok-gwang Doo, Seoul (KR); Han-su Kim, Seoul (KR); Jin-hwan Park, Seoul (KR)

(73) Assignee: Samsung SDI Co., Ltd., Yongin-si (KR)

( * ) Notice: Subject to any disclaimer, the term of this patent is extended or adjusted under 35 U.S.C. 154(b) by 834 days.

(21) Appl. No.: 12/127,278

(22) Filed: May 27, 2008

(65) Prior Publication Data
US 2009/0155687 A1 Jun. 18, 2009

(30) Foreign Application Priority Data
Dec. 18, 2007 (KR) .......................... 10-2007-0133604

(51) Int. Cl.
H01M 4/13 (2010.01)

(52) U.S. Cl. .................................. 429/231.5; 429/218.1
(58) Field of Classification Search .......... 429/122–347, 429/218.1, 231.5
See application file for complete search history.

(56) References Cited

U.S. PATENT DOCUMENTS 6,265,111 B1 * 7/2001 Bito et al. ................. 429/231.95
6,558,841 B1 * 5/2003 Nakagiri et al. ........... 429/218.1

FOREIGN PATENT DOCUMENTS
JP 09-249407 9/1997

* cited by examiner

*Primary Examiner* — Basia Ridley
*Assistant Examiner* — Jonathan G Leong
(74) *Attorney, Agent, or Firm* — Christie, Parker & Hale, LLP

(57) ABSTRACT

A composite anode active material including: a metal capable of alloy formation with lithium; an intermetallic compound; and a solid solution, in which the solid solution is an alloy of the metal capable of alloy formation with lithium and the intermetallic compound, and the solid solution and the intermetallic compound have a same crystal structure.

14 Claims, 3 Drawing Sheets

COMPOSITE ANODE ACTIVE MATERIAL, METHOD OF PREPARING THE SAME, ANODE CONTAINING THE COMPOSITE ANODE ACTIVE MATERIAL, AND LITHIUM BATTERY CONTAINING THE COMPOSITE ANODE ACTIVE MATERIAL

CROSS-REFERENCE TO RELATED APPLICATIONS

This application claims the benefit of Korean Patent Application No. 2007-133604, filed on Dec. 18, 2007, in the Korean Intellectual Property Office, the disclosure of which is incorporated herein by reference.

BACKGROUND OF THE INVENTION

1. Field of the Invention

Aspects of the present invention relate to a composite anode active material, a method of preparing the same, an anode containing the composite anode active material, and a lithium battery containing the composite anode active material, and more particularly, to a composite anode active material containing a solid solution, a method of preparing the same, an anode containing the composite anode active material, and a lithium battery containing the composite anode active material.

2. Description of the Related Art

Non-aqueous electrolyte secondary batteries using lithium compounds as anodes have high voltages and high energy densities. Specifically, metallic lithium has become the subject of intense research because of the resultant high battery capacity. However, metallic lithium is sensitive to heat or external impacts and is even explosive due to its instability and high reactivity. Furthermore, when metallic lithium is used as an anode material, a large amount of lithium may be deposited on the surface of the anode in the form of a dendrite, which may degrade charge and discharge efficiencies or cause internal-shorts between the anode and the cathode.

A carbonaceous anode performs redox reactions such that lithium ions existing in an electrolytic solution undergo intercalation/deintercalation in the carbonaceous anode having a crystal lattice structure during charge and discharge cycles, which is referred to as a "rocking chair type" anode. The carbonaceous anode is stable due to its porosity which allows the carbonaceous carbon to undergo less change in volume during charge and discharge cycles. For example, graphite, which is a highly crystalline material, when being made into a structure in the form of $LiC_6$, has a theoretical specific capacity of about 372 mAh/g. This is only about 10% of the capacity of metallic lithium, i.e., 3860 mAh/g. Meanwhile, a metal such as silicon or tin, or a lithium-containing alloy, such as lithium-aluminum, lithium-lead, lithium-tin, or lithium-silicon, has a higher electrical capacity than a carbonaceous material. However, when such an alloy of two or more metals or a single metal is used as an anode, lithium dendrite may be formed or a considerable volume change in the volumetric expansion/shrinkage of the metal may occur.

Therefore, there are many efforts to solve such problems of the anode material. For example, JP 1997-249407 discloses a composite of silicon and a carbonaceous material, such as graphite.

SUMMARY OF THE INVENTION

Aspects of the present invention provide a composite anode active material including: a metal capable of alloy formation with lithium; an intermetallic compound; and a solid solution, in which the solid solution is an alloy of the metal capable of alloy formation with lithium and the intermetallic compound, and the solid solution and the intermetallic compound have a same crystal structure.

Aspects of the present invention also provide a method of preparing a composite anode active material, the method including: mechanically milling in an inert atmosphere active material components including a metal capable of alloy formation with lithium, an intermetallic compound, and a carbonaceous material; and heat treating the mechanically milled active material components in an inert atmosphere at a temperature of 300 to 700° C.

Aspects of the present invention also provide an anode containing the composite anode active material and a lithium battery containing the composite anode active material.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
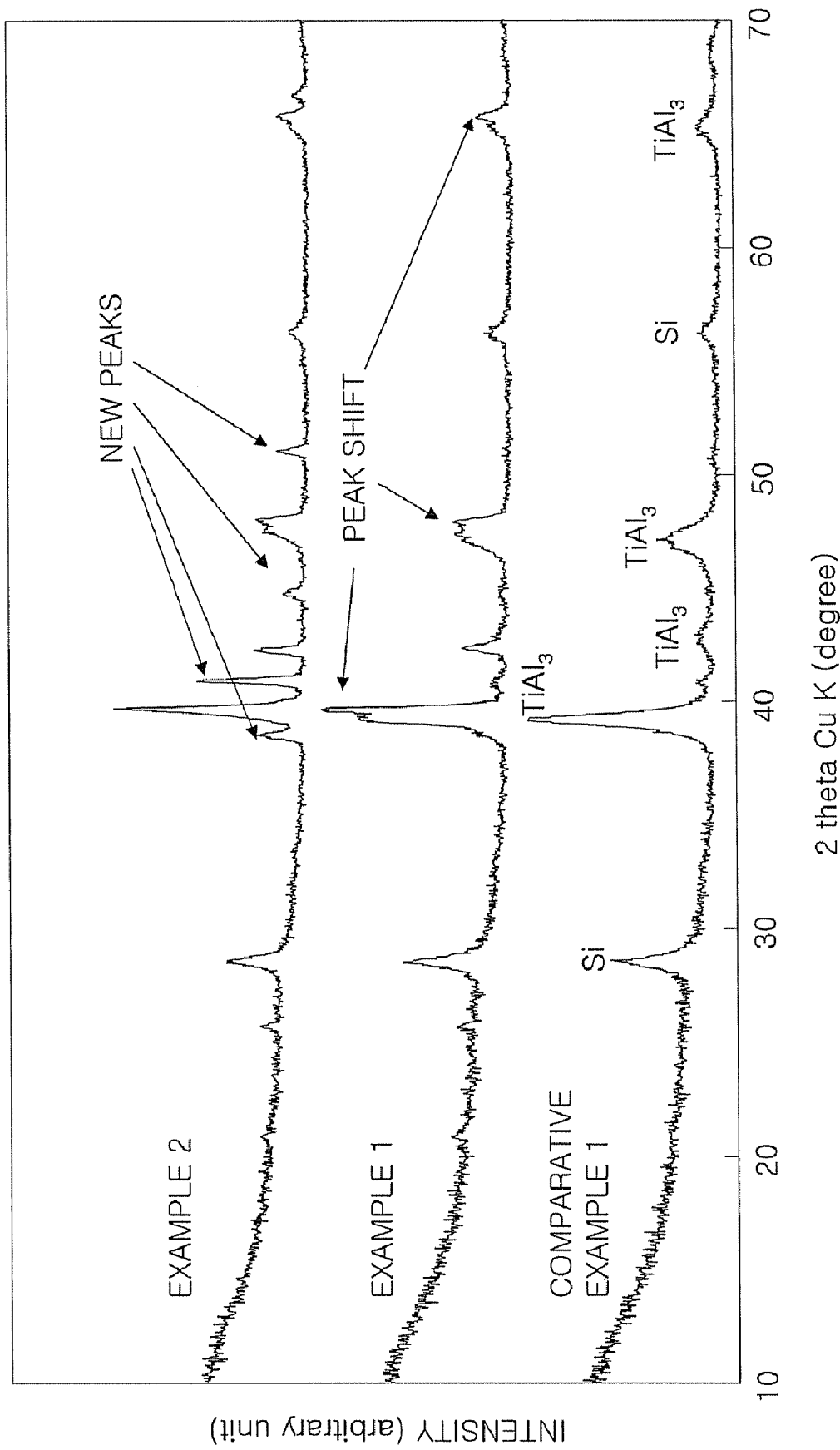
FIG. 1 shows results of an X-ray experiment performed on the composite anode active materials prepared according to Examples 1 and 2 and Comparative Example 1.

Reference will now be made in detail to the present embodiments of the present invention, examples of which are illustrated in the accompanying drawings, wherein like reference numerals refer to the like elements throughout. The embodiments are described below in order to explain aspects of the present invention by referring to the figures.

A composite anode active material according to an embodiment of the present invention includes a metal capable of alloy formation with lithium; an intermetallic compound; and a solid solution, in which the solid solution is an alloy of the metal capable of alloy formation with lithium and the intermetallic compound, and the solid solution and the intermetallic compound have a same crystal structure. The solid solution may act as a passageway through which electrons flow between the metal capable of alloy formation with lithium and the outside of the composite anode active material. The solid solution has excellent ductility and is not broken even when the metal capable of alloy formation with lithium expands and/or shrinks repeatedly. That is, even when the metal capable of alloy formation with lithium expands and/or shrinks repeatedly during charge and discharge cycles of a battery, the passageway through which electrons flow may not be blocked, and thus the cyclic lifetime of a battery is improved. The solid solution has better ductility than the intermetallic compound.

According to an embodiment of the present invention, the composite anode active material may further include a carbonaceous material. The carbonaceous material acts as a passageway of lithium ions in the composite anode active material. In addition, when the composite anode active material is formed by mechanical-milling, the carbonaceous material acts as a lubricant to facilitate good mixing of the active material components in the composite anode active material.

According to an embodiment of the present invention, the solid solution may be an alloy of the metal capable of alloy formation with lithium and the intermetallic compound. Specifically, in the solid solution, an intermetallic compound may act as a solvent and the metal capable of alloy formation with lithium may act as a solute. An atom in the crystal lattice of the intermetallic compound may be substituted with an atom of the metal capable of alloy formation with lithium. That is, a substituted solid solution can be formed. Therefore, the solid solution may have the same crystal structure as that of the intermetallic compound.

According to another embodiment of the present invention, the solid solution may be represented by Formula 1:

$$M_xM'_{y-z}M''_z \qquad \text{Formula 1}$$

where $0<x<1$, $0<y<1$, $0<z<y$, and $x+y=1$; and M, M' and M'' are each independently selected from Groups 3-14 elements. As used herein and throughout, Groups 3-14 elements includes all lanthanides and actinides. According to another embodiment of the present invention, Formula 1 satisfies a condition of $1<y/x<5$.

According to another embodiment of the present invention, the solid solution may include Ti and Al, and the crystal structure of the solid solution may be tetragonal. The tetragonal crystal structure may be an I4/mmm space group.

According to another embodiment of the present invention, the lattice constant a of a unit cell of the solid solution may be in a range of more than 3.79 Å to less than 3.85 Å, and specifically, more than 3.80 Å to less than 3.85 Å.

According to another embodiment of the present invention, the solid solution may be represented by Formula 2:

$$TiAl_{3-a}Si_a \qquad \text{Formula 2}$$

where $0<a<3$.

The solid solution is formed when Si is dissolved in $TiAl_3$. In the solid solution, the Si atoms are smaller than the Ti and Al atoms in size, and thus as more Si atoms are added thereto, the lattice constant a of a unit cell of the solid solution may be decreased.

According to an embodiment of the present invention, the amount of the solid solution may be 3 to 50 weight % based on the total weight of the composite anode active material. However, aspects of the present invention are not limited thereto such that the amount of the solid solution may be greater than or less than such weight %.

During the charging of a battery, the metal capable of alloy formation with lithium accepts electrons from the outside and forms an alloy with lithium. According to an embodiment of the present invention, the metal capable of alloy formation with lithium may include Si, Ge, Sn, Al, Ag, Au, Pt, Mg, Sb, Pb, Bi, Zn, or In, and one of these metals may be used alone, or two or more metals may be used in the form of an alloy or a composite.

The amount of the metal capable of alloy formation with lithium may be 5 to 50 weight % based on the total weight of the composite anode active material. However, the amount of the metal capable of alloy formation with lithium is not limited to such range and can be appropriately determined.

The intermetallic compound prevents the metal capable of alloy formation with lithium from being disconnected from an external electron passageway even when the metal repeatedly expands and shrinks. Since the intermetallic compound does not form an alloy with lithium, there is no volume change during the charge and discharge cycles of the battery. Further, since the intermetallic compound is not alloyed with the metal capable of alloy formation with lithium, the discharge capacity is not degraded even after a metal composite is formed.

The intermetallic compound may refer to a compound including two atoms in a certain integer ratio which shows a vertical line in a phase diagram of a two-component alloy wherein an x-axis denotes temperature and an y-axis denotes atomic % of the components which form the alloy, and may also refer to a compound which shows an area in a phase diagram, i.e., a compound forming an intermediate phase having a composition in a certain range. Such compounds, including two elements, do not have a particular composition but have compositions in a certain range. According to another embodiment of the present invention, the intermetallic compound may exist in one or at least two intermediate phases, and each of the intermediate phases may include at least two elements selected from the group consisting of Groups 3-14 elements. The intermediate phase has a different crystal structure from that of a single phase of respective elements included in the intermediate phase. Also, the at least two intermediate phases may have different crystal structures from each other.

According to another embodiment of the present invention, the intermetallic compound may be represented by Formula 3:

$$M_xM'_y \qquad \text{Formula 3}$$

where $0<x<1$, $0<y<1$, and $x+y=1$; and M and M' are selected from Groups 3-14 elements. According to another embodiment of the present invention, Formula 3 satisfies a condition of $1<y/x<5$. For example, M may be Ni, Ti, Co, V, or Mo, and M' may be Al.

According to another embodiment of the present invention, in the intermediate phase, the intermetallic compound may include $NiAl_3$, $TiAl_3$, $Co_2Al_9$, $CoAl_3$, $Co_4Al_{13}$, $VAl_3$, $V_5Al_8$, and/or $MoAl_5$.

According to another embodiment of the present invention, in the intermediate phase, the intermetallic compound may include a compound including elements of a predetermined compositional range. For example, the intermetallic compound may include at least one intermediate phase selected from the group consisting of an intermediate phase including a compound represented by $Ni_xAl_y$ where $0.37<x<0.41$ and $x+y=1$ at 400° C., an intermediate phase including a compound represented by $Ni_xAl_y$ where $0.45<x<0.59$ and $x+y=1$ at 400° C., an intermediate phase including a compound represented by $Ni_xAl_y$ where $0.64<x<0.68$ and $x+y=1$ at 400° C., and an intermediate phase including a compound represented by $Ni_xAl_y$ where $0.73<x<0.75$ and $x+y=1$ at 400° C. Also, the intermetallic compound may include at least one intermediate phase selected from the group consisting of an intermediate phase including a compound represented by $Ti_xAl_y$ where $0.45<x<0.51$ and $x+y=1$ at 500° C. and an intermediate phase including a compound represented by $Ti_xAl_y$ where $0.65<x<0.78$ and $x+y=1$ at 500° C. An intermediate phase having a predetermined compositional ratio with respect to Co, V, and Mo may be an intermediate phase including a compound represented by $Co_xAl_y$ where $0.47<x<0.56$ and $x+y=1$ at 200° C., an intermediate phase including a compound represented by $Mo_xAl_y$ where $0.25<x<0.31$ and $x+y=1$ at 400° C., or an intermediate phase including a compound represented by $Mo_xAl_y$ where $0.73<x<0.78$ and $x+y=1$ at 400° C. The intermetallic compound may have the same crystal structure in a single intermediate phase although there is a difference in a chemical composition. The intermetallic compound may be $NiAl_3$, $TiAl_3$, $Co_2Al_9$, $Co_4Al_{13}$, $VAl_3$, or $MoAl_5$. The amount of the intermetallic compound may be in a range of 30 to 90 weight % based on the total weight of the composite anode active material. However, the amount of the intermetallic compound need not be limited to such range.

According to an embodiment of the present invention, the carbonaceous material may be graphite, carbon black, amorphous carbon, fibrous carbon, or a combination thereof. However, the carbonaceous material is not limited thereto.

According to an embodiment of the present invention, the amount of the carbonaceous material may be in a range of 5 to 50 weight % based on the total weight of the composite anode active material. When the amount of the carbonaceous material is less than 5 weight %, lithium ion flow through the carbonaceous material decreases; on the other hand, when the amount of the carbonaceous material is greater than 50 weight %, the initial coulombic efficiency may be considerably reduced due to decomposition of the electrolyte solution.

A method of preparing a composite anode active material according to aspects of the present invention includes: mechanically milling active material components including a metal capable of alloy formation with lithium, an intermetallic compound, and a carbonaceous material under an inert atmosphere; and heat-treating the mechanically milled active material components under an inert atmosphere at a temperature of 300 to 700° C.

In the heat-treating process, the metal capable of alloy formation with lithium and the intermetallic compound may be partially dissolved to form a solid solution. When the heat treatment temperature is lower than 300° C., the solid solution may not be formed. On the other hand, the heat treatment temperature is higher than 700° C., the amount of the metal capable of alloy formation with lithium may be significantly reduced. In the heat-treating process, the heat treatment time may be performed for 0.1 or more hours, and specifically, for 0.1 to 5 hours.

Through the mechanical milling, the active material components are milled and recombined to be a complex. In the method, the metal capable of alloy formation with lithium, the intermetallic compound, and carbonaceous material may be the same as described above.

The method of preparing a composite anode active material is not limited to the method describe above. For example, a solid solution that has a crystal structure belonging to the I4/mmm space group and the lattice constant a of a unit cell of 3.80 Å to than 3.85 Å can be prepared by arc melting; and then, the solid solution can be mechanically milled together with a metal capable of alloy formation with lithium, an intermetallic compound, and a carbonaceous material. Further, the carbonaceous material need not be included in the composite anode active material as described above.

An anode according to aspects of the present invention includes the composite anode active material. The anode may be manufactured by, for example, forming an anode active material composition including the composite anode active material and a binder and formed in a predetermined shape, or by applying the anode active material composition onto a current collector made of, e.g., copper foil. More specifically, an anode composition may be prepared and then directly coated on a copper foil current collector to obtain an anode plate. Alternatively, the anode active material composition may be cast on a separate support body, and then a porous anode active material film is removed from the support body and laminated on the copper foil current collector to obtain an anode plate. The anode according to aspects of the present invention is not limited to the illustrated examples and many other modifications may be made within the scope of the invention.

To attain higher capacity batteries, charging and discharging with a large amount of current is required, which requires a low resistance material to be used as an electrode material. Thus, a reduction in resistance of the electrode can be achieved by adding a conducting agent. Examples of the conducting agent include carbon black or graphite particles.

A lithium battery according to an embodiment of the present invention includes the anode that includes the composite anode active material. A method of preparing the lithium battery will now be described in detail. First, a cathode active material, a conducting agent, a binder, and a solvent are mixed to prepare a cathode active material composition. The cathode active material composition is directly coated on a metallic current collector and dried to prepare a cathode plate. In an alternative embodiment, the cathode active material composition is cast on a separate support body, removed from the support body to obtain a cathode active material film, and then the cathode active material film is laminated on the metallic current collector to obtain a cathode plate.

A lithium-containing metal oxide may be used as the cathode active material. Examples of a lithium-containing metal oxide include, but are not limited to, $LiCoO_2$, $LiMn_xO_{2x}$(x=1, 2), $LiNi_{x-1}Mn_xO_{2x}$ (0<x<1), and $LiNi_{1-x-y}Co_xMn_yO_2$ ($0 \leq x \leq 0.5$, $0 \leq y \leq 0.5$). Specific examples of the lithium-containing metal oxide are compounds capable of being oxidized and reduced with deintercalation and intercalation of lithium ions include $LiMn_2O_4$, $LiCoO_2$, $LiNiO_2$, $LiFeO_2$, $V_2O_5$, $TiS_2$, $MoS_2$, or the like. Carbon black is typically used as the conducting agent. Examples of the binder include a vinylidene fluoride/hexafluoropropylene (HFP) copolymer, polyvinylidene difluoride (PVDF), polyacrylonitrile, polymethacrylate, polytetrafluoroethylene, mixtures of these materials, and a styrene butadiene rubber polymer. As the solvent, N-methyl-pyrrolidone, acetone, water, or the like, is used. Here, the amount of the cathode active material, the conducting agent, the binder, and the solvent used in the manufacture of the lithium battery are amounts generally acceptable in the art.

Any separator that is commonly used for lithium batteries can be used in the current embodiment. In particular, a separator used may have low resistance to migration of ions in an electrolyte and have an excellent electrolyte-retaining ability. Specific examples of the separator are glass fiber, polyester, polyethylene, polypropylene, polytetrafluoroethylene (PTFE), and combinations thereof. The separator may be a material that can be rolled and that may be in non-woven or woven fabric form. In particular, a separator comprising, but not limited to, polyethylene, polypropylene, or the like can be used for a lithium ion battery. A separator that can retain a large amount of an organic electrolytic solution may be used for a lithium-ion polymer battery. A method of forming these separators will now be described.

A polymer resin, a filler, and a solvent are mixed to prepare a separator composition. The separator composition is directly coated on the electrode, and then dried to form a separator film. Alternatively, the separator composition can be cast onto a separate support, dried, detached from the separate support, and laminated on a portion of the electrode, thereby forming a separator film. Any polymer resin that is commonly used for lithium batteries can be used in the current embodiment. Examples of the polymer resin include, but are not limited to, vinylidenefluoride/hexafluoropropylene copolymer, polyvinylidenefluoride, polyacrylonitrile, polymethylmethacrylate, and mixtures thereof.

In the electrolyte solution, the solvent that is used according to aspects of the present invention can be a solvent selected from the group consisting of propylene carbonate, ethylene carbonate, fluoroethylene carbonate, diethyl carbonate, ethylmethyl carbonate, methylpropyl carbonate, butylene carbonate, benzonitrile, acetonitrile, tetrahydrofuran, 2-methyltetrahydrofuran, gamma-butyrolactone, dioxolane, 4-methyldioxolane, N,N-dimethyl formamide, dimethyl acetamide, dimethylsulfoxide, dioxane, 1,2-dimethoxyethane, sulfolane, dichloroethane, chlorobenzene, nitrobenzene, dimethyl carbonate, methylethyl carbonate, diethyl carbonate, methylpropyl carbonate, methylisopropyl carbonate, ethylpropyl carbonate, dipropyl carbonate, dibutyl carbonate, diethylene glycol, dimethyl ether, and a mixture thereof. The electrolyte according to aspects of the present invention may be a lithium salt in an electrolyte solvent, such as $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (where x and y are each independently a natural number), or a mixture thereof.

The separator is disposed between the cathode plate and the anode plate to form an electrode assembly. The electrode assembly is wound or folded and then sealed in a cylindrical or rectangular battery case. Then, the electrolyte solution is injected into the battery case to complete preparation of a lithium ion battery. Alternatively, the electrode assembly may be stacked in a multi-cell structure and impregnated with an organic electrolyte solution. The resultant product is then put into a pouch and hermetically sealed, thereby completing a lithium ion polymer battery.

Aspects of the present invention will be described in further detail with reference to the following examples. These examples are for illustrative purposes only and are not intended to limit the scope of the present invention.

Composite Anode Active Material

Example 1

1.0 g of silicon powder (from Nanostructured & Amorphous Materials, Inc.) having an average diameter of 100 nm, 1.6 g of $TiAl_3$, and 0.4 g of artificial graphite were placed together with 6 steel balls (the weight of each steel ball was 21 g) in a sealed container formed of hardened steel. The sealed, hardened steel container was filled with Ar gas. Then, a milling process was performed using 8000M Mixer/Mill produced by SPEX Certiprep, Inc. for 60 minutes to obtain Si/$TiAl_3$/graphite complex. The mechanically milled Si/$TiAl_3$/graphite complex was heat-treated under an Ar atmosphere at 400° C. for one hour to obtain a Si/$TiAl_3$/solid solution/graphite complex.

Example 2

A Si/$TiAl_3$/solid solution/graphite complex was prepared in the same manner as in Example 1, except that the heat treatment process was performed at a temperature of 600° C.

Comparative Example 1

1.0 g of silicon powder (from Nanostructured & Amorphous Materials, Inc.) having an average diameter of 100 nm, 1.6 g of $TiAl_3$, and 0.4 g of artificial graphite were placed together with 6 steel balls (the weight of each steel ball was 21 g) in a sealed container formed of hardened steel. The sealed, hardened steel container was filled with Ar gas. Then, a milling process was performed using 8000M Mixer/Mill produced by SPEX Certiprep (USA) for 60 minutes to obtain Si/$TiAl_3$/graphite complex.

Anode and Lithium Battery

Example 3

0.175 g of the composite anode active material powder prepared according to Example 1, 0.050 g of graphite powder having an average diameter of 2 μm, and 0.050 g of polyvinylidene difluoride (PVDF) were mixed with 1 mL of N-methylpyrrolidone (NMP) in an agate mortar to prepare a slurry. The slurry was coated on a Cu collector using a doctor blade at a thickness of about 50 μm, dried at room temperature, and then dried in vacuum at 110° C., thereby preparing an anode plate.

A 2016-standard coin cell was manufactured using the prepared anode, a counter electrode made of a lithium metal, a PTFE separator, and an electrolyte solution including 1 M $LiPF_6$ melted in a mixture of EC (ethylene carbonate), DEC (diethyl carbonate), and FEC (fluoroethylene carbonate) in a 2:6:2 volume ratio.

Example 4

A 2016-standard coin cell was manufactured in the same manner as in Example 3 except that the composite anode active material prepared according to Example 2 was used instead of the composite anode active material prepared according to Example 1.

Comparative Example 2

A 2016-standard coin cell was manufactured in the same manner as in Example 3 except that the composite anode active material prepared according to Comparative Example 1 was used instead of the composite anode active material prepared according to Example 1.

X-Ray Diffraction Experiment

An X-ray diffraction experiment was performed on each of the composite anode active materials prepared according to Examples 1 and 2, and Comparative Example 1. The results are shown in FIGS. 1 and 2.

As shown in FIG. 1, in the case of the composite anode active material prepared according to Comparative Example 1 in which the heat treatment was not performed, there were only peaks representative of Si and $TiAl_3$. In the case of the composite anode active material prepared according to Example 1 in which the heat treatment was performed at 400° C., the peak of $TiAl_3$ was smaller than that of Comparative Example 1 and there were new peaks present. In the case of the composite anode active material prepared according to Example 2 in which the heat treatment was performed at 600° C., the peak of $TiAl_3$ was smaller than that of Example 1 and there were additional new peaks present. In the case of the composite anode active materials prepared according to Examples 1 and 2, the peak of Si was not substantially decreased. Further, the X-ray diffraction showed that the peaks of the $TiAl_3$ were shifted to the right.

Figure 2:
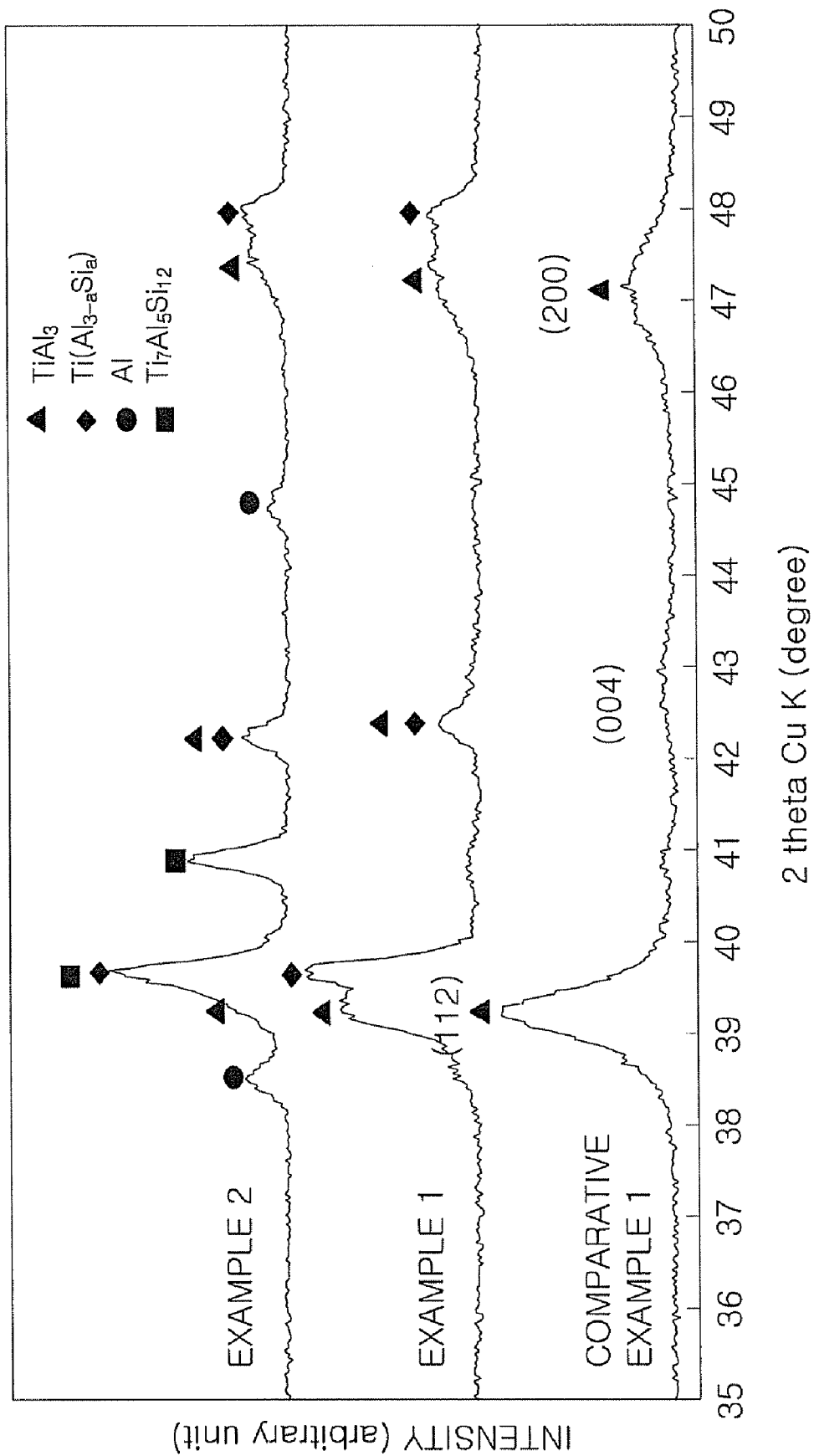
FIG. 2 is an enlarged view of a part of FIG. 1.

To analyze the new peaks in detail, a part of FIG. 1 was enlarged, which is illustrated in FIG. 2. As clearly shown in FIG. 2, in the case of the composite anode active materials prepared according to Examples 1 and 2, new peaks appear to the right of the peak of TiAl$_3$. The new peaks of Example 1 are a peak of TiAl$_3$ and a peak of a solid solution (TiAl$_{3-a}$Si$_a$, 0<a<3) including Si. When Si, which is smaller than Ti and Al in size, is dissolved in the TiAl$_3$, the lattice size of a unit cell is decreased and the lattice constant is decreased. The solid solution having the decreased lattice constant shows its peak to the right of the peak of TiAl$_3$ in the X-ray diffraction spectrum. When the amount of Si in the TiAl$_3$ is increased from 0 atom % to 15 atom %, lattice constant a is decreased from 3.853 Å to 3.801 Å, and lattice constant c is decreased from 8.583 Å to 8.577 Å. Since the change in lattice constant a is greater than the change in lattice constant c, peak (112) and peak (200) are shifted more to the right side than peak (004). The lattice constant a evaluated from the position of the (200) peak is about 3.80 Å.

In the case of the composite anode active material prepared according to Example 2, there were peaks of Al that was deposited in the heat treatment process and of Ti$_7$Al$_5$Si$_{12}$, which is a three-component compound, in addition to the peak of the solid solution.

Evaluation Example 2

Charge-Discharge Cycle Performance Test

Figure 3:
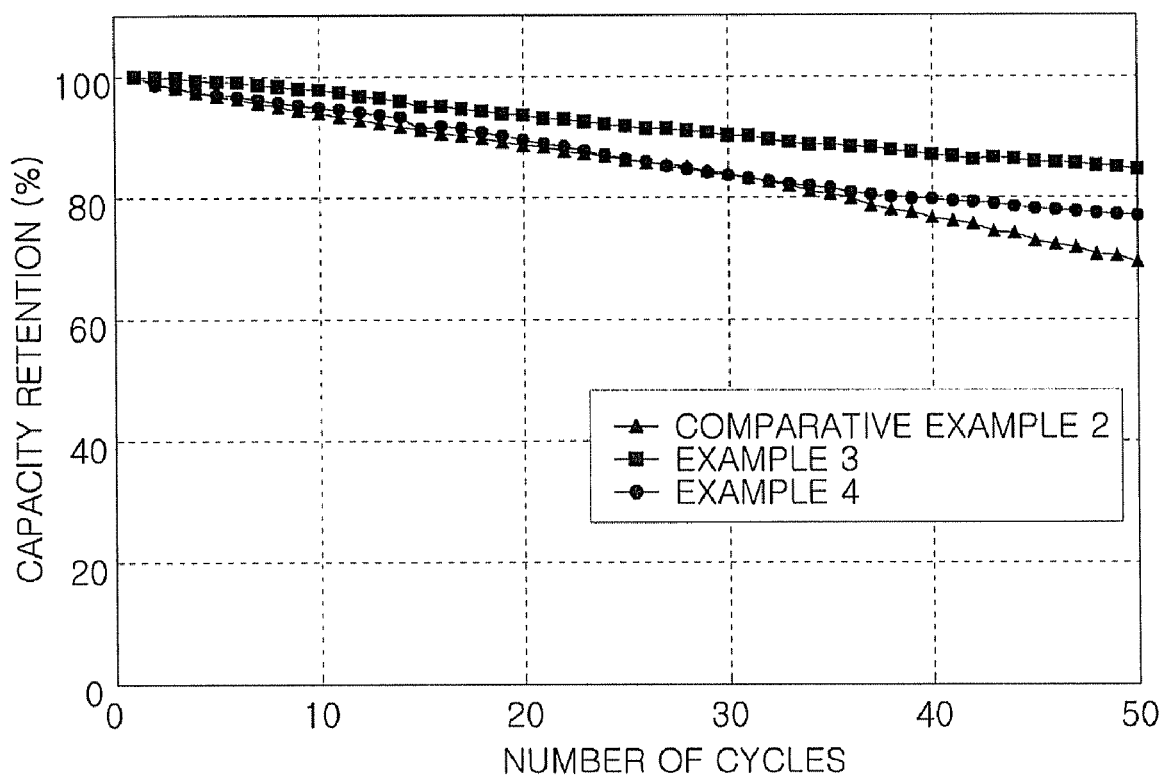
FIG. 3 is a graph of cycle lifetime of the lithium batteries prepared according to Examples 3 and 4 and Comparative Example 2.

The coin cells prepared according to Examples 3 and 4 and Comparative Example 2 were charged (lithiated) with a current of 100 mA with respect to 1 g of a composite anode active material until a voltage of 0.001V (vs. Li) was reached. Then, the charged coin cells were discharged (delithiated) with the same current until a voltage of 1.5V (vs. Li) was reached. Then, charging and discharging were repeatedly performed 50 cycles using the current and voltage as described above. A discharge capacity at the first cycle was divided by a volume of the anode to obtain a capacity density per volume. The discharge capacity at the fiftieth cycle was divided by the discharge capacity at the first cycle to obtain a capacity retention rate (%) and identify the cycle lifetime. The results are shown in Table 1. The change of capacity retention rate with respect to the number of cycles is shown in FIG. 3.

TABLE 1

|  | Initial capacity per volume [mAh/cc] | Capacity retention rate after 50 cycles [%] |
| --- | --- | --- |
| Example 3 | 1278 | 85.6 |
| Example 4 | 1189 | 77.1 |
| Comparative Example 2 | 1439 | 69.5 |

As shown in Table 1, the cells prepared according to Examples 3 and 4 in which the composite anode active material according to aspects of the present invention is used have longer cycle lifetimes than the cell prepared according to Comparative Example 2.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A composite anode active material, comprising: a metal, M", capable of alloy formation with lithium; an intermetallic compound which forms at least one intermediate phase, and each of the at least one intermediate phase comprises a compound represented by M$_x$M'$_y$ where 0<x<1, 0<y<1, and x+y=1; M' is Al, and M is selected from Ni, Ti, Co, V, and Mo; and a solid solution which is an alloy of the metal, M", capable of alloy formation with lithium and the intermetallic compound, the solid solution having a same crystal structure as the intermetallic compound, and the solid solution being represented by M$_x$M'$_{y-z}$M"$_z$ where 0<x<1, 0<y<1, 0<z<y, and x+y=1; and M" is selected from Sc, Y, Lu, Mn, Re, Fe, Ru, Os, Cu, Ag, Au, Zn, Cd, Hg, La, Ce, Pr, Nd, Sm, Eu, Gd, Tb, Dy, Ho, Er, Tm, Yb, Th, Pa, U, Zr, Hf, Nb, Ta, Cr, W, Rh, Ir, Pd, Pt, Ga, In, Tl, Si, Ge, Pb, Mg, Sb, and Bi, and the composition of the solid solution is different from the composition of the intermetallic compound.

2. The composite anode active material of claim 1, further comprising a carbonaceous material.

3. The composite anode active material of claim 1, wherein 1<y/x<5.

4. The composite anode active material of claim 1, wherein the solid solution comprises Ti and Al.

5. The composite anode active material of claim 1, wherein the solid solution has a crystal structure belonging to an I4/mmm space group.

6. The composite anode active material of claim 1, wherein a lattice constant a of a unit cell of the solid solution is 3.79 Å to 3.85 Å.

7. The composite anode active material of claim 1, wherein a lattice constant a of a unit cell of the solid solution is 3.80 Å to 3.85 Å.

8. The composite anode active material of claim 1, wherein the solid solution is represented by Formula 2:

$$TiAl_{3-a}Si_a \qquad \text{Formula 2}$$

where 0<a<3.

9. The composite anode active material of claim 1, wherein the amount of the solid solution is 3 to 50 weight % based on the total weight of the composite anode active material.

10. The composite anode active material of claim 1, wherein the metal, M", capable of alloy formation with lithium comprises at least one metal selected from the group consisting of Si, Ge, Ag, Au, Pt, Mg, Sb, Pb, Bi, Zn, and In.

11. The composite anode active material of claim 1, wherein the intermetallic compound includes at least one compound selected from the group consisting of NiAl$_3$, TiAl$_3$, Co$_2$Al$_9$, CoAl$_3$, Co$_4$Al$_{13}$, VAl$_3$, V$_5$Al$_8$, and MoAl$_5$.

12. The composite anode active material of claim 2, wherein the carbonaceous material comprises at least one material selected from the group consisting of graphite, carbon black, amorphous carbon, and fibrous carbon.

13. An anode comprising the composite anode active material of claim 1.

14. A lithium battery comprising the anode of claim 13.

* * * * *